S. G. BLACKMAN.
Car Seat.
No 80,703.
Patented Aug. 4, 1868.
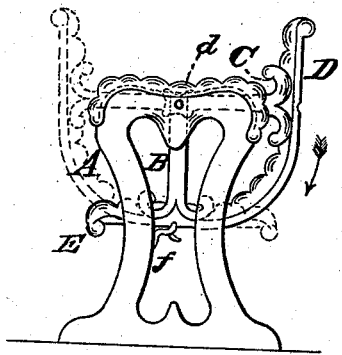
Witnesses:
Inventor:
Samuel G. Blackman
By his Attorney

United States Patent Office.

SAMUEL G. BLACKMAN, OF WATERBURY, CONNECTICUT.

*Letters Patent No. 80,703, dated August 4, 1868.*

IMPROVED CAR-SEAT.

*The Schedule referred to in these Letters Patent and making part of the same.*

TO ALL WHOM IT MAY CONCERN:

Be it known that I, SAMUEL G. BLACKMAN, of Waterbury, in the county of New Haven, and State of Connecticut, have invented a new Improvement in Car-Seats; and I do hereby declare the following, when taken in connection with the accompanying drawing, and the letters of reference marked thereon, to be a full, clear, and exact description of the same, and which said drawing constitutes part of this specification, and represents an end view.

This invention relates to an improvement in reversible or adjustable seats for railroad-cars, or for whatever purpose a reversible seat is desirable, the object being to avoid the usual turning over of the back of the seat for the purpose of facing in the opposite direction; and the invention consists in forming the back and seat alike or similar, and hung upon a pivot common to both, so that in one case pressing down the back, raises the seat, so as to form a back facing in the other direction, while what was before the back becomes the seat.

To enable others to construct my improvement, I will proceed to describe the same as illustrated in the accompanying drawings.

A represents the frame or end of an ordinary railroad-car seat. From a central point, $d$, extend arms B and C, to which are fixed the back D and seat E, so that both will swing upon a common centre or point, $d$. The seat here represented as facing the left. To reverse the seat, to face in the opposite direction, press down the back in the direction denoted by the arrow, which, (the back and seat being secured together,) raises the seat E, while the back D falls to a level position, as denoted in red; thus that part which was before the seat, now becomes the back, while that which was before the back, becomes the seat. A spring, $f$, or any suitable device may be arranged to secure the seat in any desirable position, for the comfort of the sitter. Thus I avoid the annoyance and inconvenience of raising the back, and turning it over to reverse the seat, (an inconvenience which it requires no small amount of strength to overcome,) and at the same time I form a seat which may be adjusted to any desirable inclination.

In designating the part E as the seat, and the part D as the back, I do so only as a convenience in description, as the face position determines which of the two is the back, and which the seat.

I have represented the two as formed in one continuous piece, but it is not essential, as they may be made separate, it only being required that they be so attached at the common centre, that they both move together.

Having thus fully described my invention, what I claim as new and useful, and desire to secure by Letters Patent, is—

A reversible or adjustable seat, constructed in the manner described; that is to say, the two parts which form the back and seat, according to the position in which the seat is adjusted, are pivoted upon a common centre, so that both are turned to reverse the seat, substantially in the manner herein set forth.

SAMUEL G. BLACKMAN.

Witnesses:
 J. H. SHUMWAY,
 A. J. TIBBITS.